Nov. 1, 1927.
A. C. MATLACK
ARTIFICIAL FLOWER
Filed April 14, 1927
1,647,533
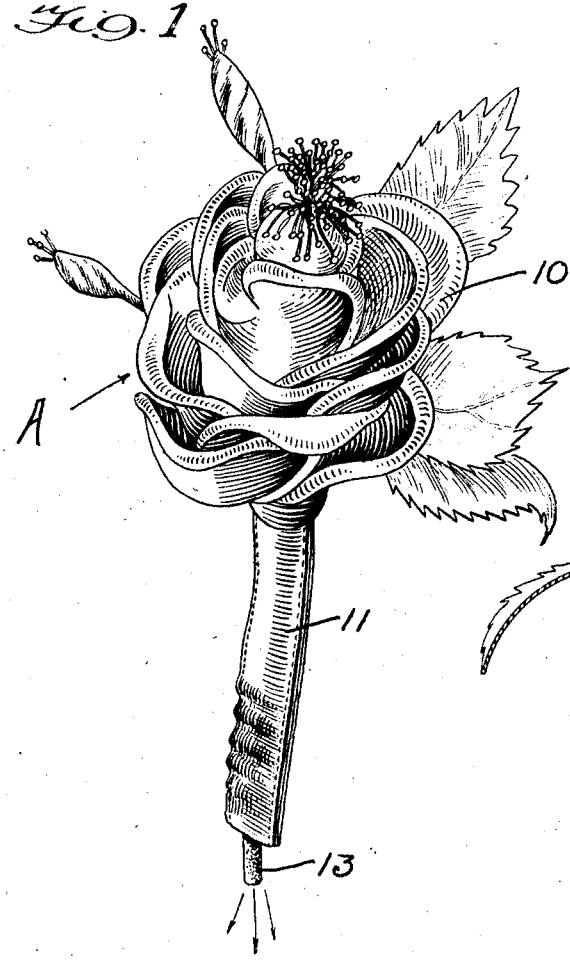
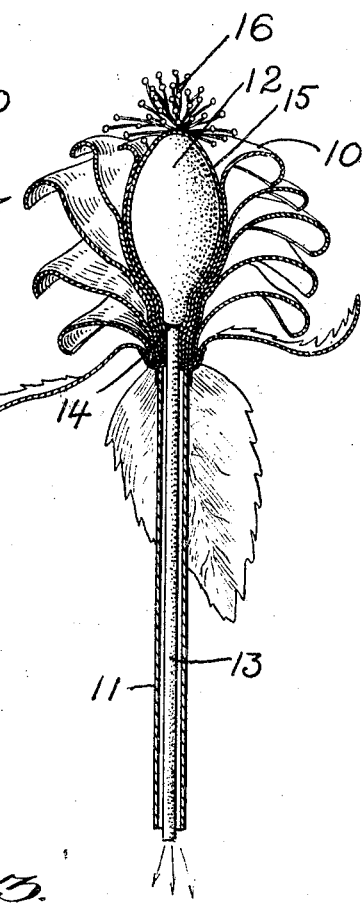
Inventor
Adelaide C. Matlack
By John Blind
Attorney Patented Nov. 1, 1927.

1,647,533

UNITED STATES PATENT OFFICE.

ADELAIDE C. MATLACK, OF MIAMI, FLORIDA.

ARTIFICIAL FLOWER.

Application filed April 14, 1927. Serial No. 183,754.

This invention relates to artificial flowers in which a container is provided for holding perfumes.

One of the objects of the invention is to conceal the container within the artificial flower so as not to detract from the appearance and beauty of the flower.

A further object is to provide means whereby the container can be easily filled with perfume and at the same time the perfume can be easily dispensed from the container.

With these and other objects in view as will hereinafter appear my invention consists in the construction, arrangement and combination of the various parts of my device whereby the objects contemplated are attained as more fully set forth below, pointed out in my claims and illustrated in the accompanying drawings in which:

Figure 1 shows a perspective view;

Figure 2 a central, longitudinal, sectional view and

Figure 3 is a cross section through the stem of the flower.

Referring to the drawings, A indicates generally my complete device which is shown as a rose, although any other type of flower can be used.

The leaves of the rose are indicated at 10 and a stem 11 of hollow construction extends therefrom. Disposed in the central portion of the leaves and petals and to a greater extent hidden thereby is a rubber or resilient bulb member 12. Secured to the lower end of the bulb member 12 is a rubber tube 13 which extends down through the stem 11 and is hidden thereby. The bulb member 12 is secured to the tube 13 at 14 in any suitable manner.

The bulb member 12 is covered with a decorative cloth 15 and this cloth or fabric which is of suitable color to simulate the interior of the particular flower used carries thereon artificial pollen 16.

The operation of my device is believed to be obvious. The stem member 11 which is as above mentioned hollow is first pulled back so as to expose the lower open end of the tube 13 as shown in Figure 1. The open end of the tube 13 is then inserted in a perfume container and the pulb member 12 is collapsed expelling any air therein. The bulb member is then allowed to expand and in expanding will draw up perfume through the tube 13 from the perfume container.

The artificial flower is then pinned upon the corsage or the lapel of a coat and whenever it is desired to dispense any of the perfume contained in the bulb 12 it is merely necessary to press the bulb 12 gently and then a few drops of perfume will be dispensed from the open end of the tube 13 in an obvious manner.

It will be noted that the artificial flower described above is extremely easy to refill and that perfume can be dispensed therefrom at a minimum of effort. At the same time the perfume container carried by the flower is hidden from view and does not detract in any way from the beauty of the flower.

Some changes may be made in the construction and arrangement of the invention above set forth without departing from the real purpose and spirit thereof, and it is the intention to cover by the following claims, any modified forms of structure or use of equivalents, which may be reasonably included within their scope.

I claim:

1. In an artificial flower a resilient perfume container, constituting part of the decorative features of said flower.

2. In an artificial flower having petals and a stem, a resilient perfume container and means whereby the perfume in said container may be dispensed through said stem.

3. In an artificial flower, a rubber bulb perfume container located within the petals of said flower and means whereby perfume may be dispensed from said container by a gentle pressure thereon.

4. In a device of the class described, an artificial flower having a hollow stem, a resilient perfume container hidden in said flower and means for dispensing the perfume carried by said container through said hollow stem.

5. In a device of the class described, an artificial flower having petals and a stem, a perfume container hidden in said petals and a flexible tube extending from said perfume container through said stem.

6. In a device of the class described, an artificial flower having petals and a hollow flexible stem, a perfume container hidden within said petals and a flexible tube extending from said perfume container through said hollow stem whereby said hollow stem can be withdrawn so as to expose said tube for insertion in a perfume container.

7. In an artificial flower, a container constituting part of the decorative features of said flower and means whereby said container may be refilled.

8. In an artificial flower, a perfume container constituting part of the decorative features of said flower, means for refilling said container and means whereby said perfume may be dispensed in small quantities.

ADELAIDE C. MATLACK.